US011910174B1

(12) United States Patent
Faraone

(10) Patent No.: US 11,910,174 B1
(45) Date of Patent: Feb. 20, 2024

(54) RADIALLY ARCUATED UNISTRUCTURAL SPEAKER CONE WITH SEGMENTED DOME

(71) Applicant: Alexander Faraone, Frenchtown, NJ (US)

(72) Inventor: Alexander Faraone, Frenchtown, NJ (US)

( * ) Notice: Subject to any disclaimer, the term of this patent is extended or adjusted under 35 U.S.C. 154(b) by 0 days.

(21) Appl. No.: 18/445,073

(22) Filed: Mar. 31, 2023

(51) Int. Cl.
*H04R 7/12* (2006.01)
*H04R 7/22* (2006.01)

(52) U.S. Cl.
CPC ............. *H04R 7/127* (2013.01); *H04R 7/122* (2013.01); *H04R 7/22* (2013.01); *H04R 2207/021* (2013.01)

(58) Field of Classification Search
CPC .......... H04R 7/127; H04R 7/122; H04R 7/22; H04R 7/02; H04R 7/12; H04R 7/14; H04R 2207/021
USPC ......................................... 381/430, 424, 423
See application file for complete search history.

(56) References Cited

U.S. PATENT DOCUMENTS 1,787,946 A * 1/1931 La Rue .................... H04R 7/20 381/186
4,321,434 A * 3/1982 Irie .......................... H04R 7/14 181/173
4,881,617 A * 11/1989 Faraone ................... H04R 7/14 181/173
5,880,412 A * 3/1999 Faraone ................... H04R 7/14 181/173
5,991,421 A 11/1999 Faraone
6,026,929 A * 2/2000 Faraone ................... H04R 7/14 181/173
6,028,947 A 2/2000 Faraone et al.
6,134,337 A 10/2000 Isaka
6,343,133 B1 1/2002 Adamson
6,466,680 B1 10/2002 Gelow et al.
6,474,440 B2 11/2002 Kato
6,650,760 B1 11/2003 Andrews et al.
7,315,628 B2 1/2008 Kuribayashi et al.
7,711,137 B2 5/2010 Optiz
8,208,679 B2 6/2012 Opitz
8,213,658 B2 7/2012 Robineau
8,265,332 B2 * 9/2012 Kumakura ............... H04R 7/14 381/423
8,761,425 B2 6/2014 Donarski
11,012,773 B2 5/2021 Bezzola
11,356,773 B2 6/2022 Brunet et al.
2016/0014519 A1 * 1/2016 Oclee-Brown .......... H04R 7/14 181/171
2019/0289401 A1 * 9/2019 Fujitani .................... H04R 7/20
2019/0379979 A1 * 12/2019 Wang ................... H04R 31/003
2022/0236460 A1 * 7/2022 Lai ......................... G02B 5/005

* cited by examiner

*Primary Examiner* — Ahmad F. Matar
*Assistant Examiner* — Sabrina Diaz

(57) ABSTRACT

An unistructurally formed acoustic speaker cone unit includes (a) a suspension ring with at least one continuous loop rib; (b) a central dome-shaped cone with thin, arcuate pie-shaped segments which radiate outwardly, and with a plurality of arc ribs; and (c) a main diaphragm having a plurality of segments radiating outwardly and extending to the suspension ring. Each main diaphragm segment has an arcuate cross-section, thereby creating a concave side and a convex side. The central cone segments are preferably equal in number to the diaphragm segments and are in alignment therewith.

20 Claims, 14 Drawing Sheets back of segment as viewed from suspension 809
( transparent )

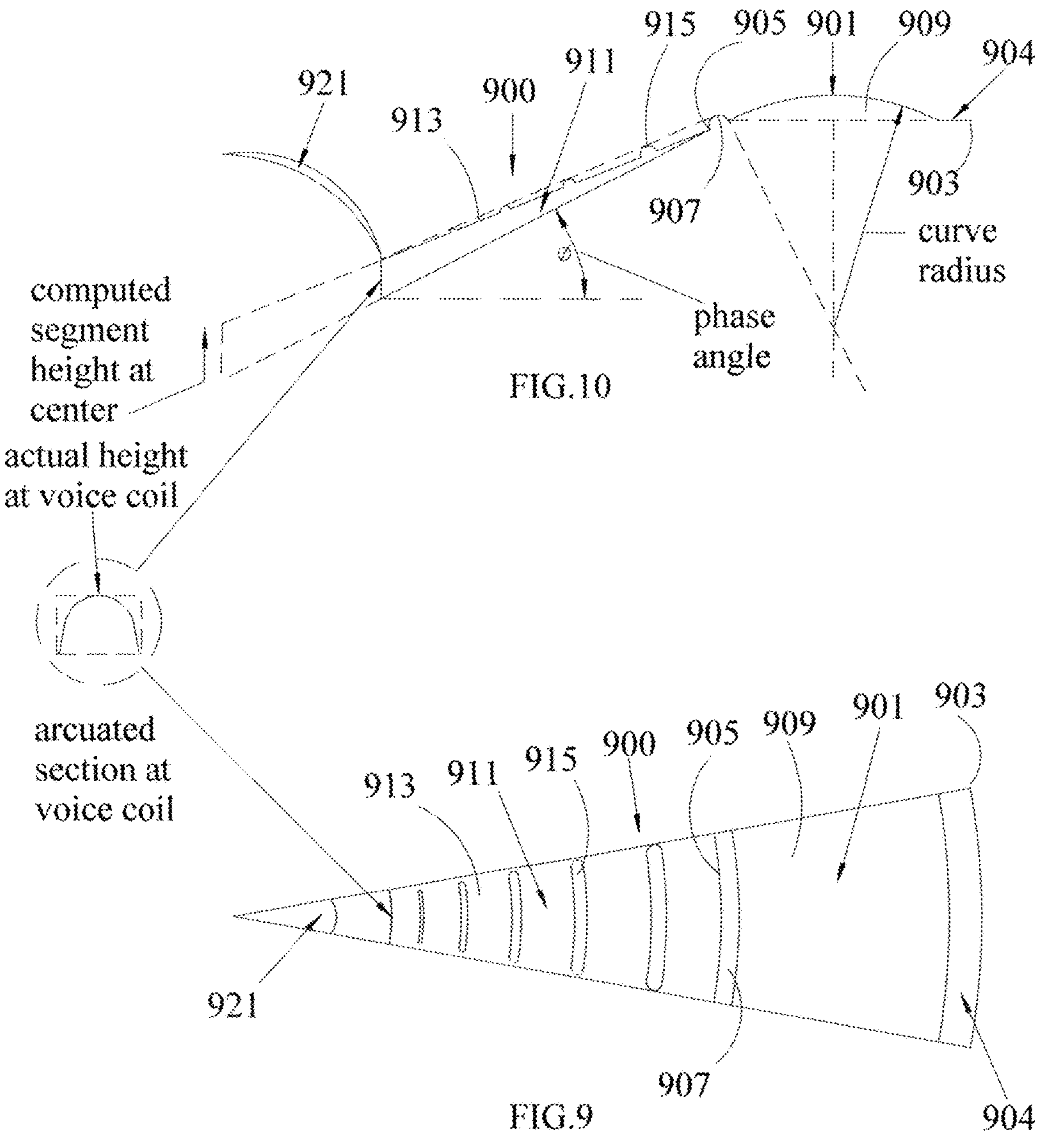
speaker cone segment side view FIG.10 and front view FIG.9 speaker cone segment side view FIG.12 and front view FIG.11 single speaker enclosure dual speaker enclosure

RADIALLY ARCUATED UNISTRUCTURAL SPEAKER CONE WITH SEGMENTED DOME

BACKGROUND OF INVENTION a. Field of Invention

The present invention relates to speaker cone units that have unique characteristics to enhance both the quality of sound and the range of sounds. These speaker cone units may be used for any speaker function with broad applications, such as cell phones, portable Wi-Fi, blue tooth and other speakers, auto speakers, etc. and are especially useful for exceptionally high-quality acoustic speakers for music listening. They are likewise very efficient and high-quality for large speakers and significant fields of projection, such as arenas, ball fields, and PAs. The present invention speaker units are unistructurally formed ("unistructure", "unistructural" and "unistructurally" are used herein to mean made seamlessly, and thus are of single, continuous structure; by example, multiple formed pieces that are glued together, or heat welded or otherwise assembled are not included in this definition). By use of the word "cone unit" is meant the structure that is a single piece containing at least the suspension ring, the main diaphragm and the central dome-shaped cone. The present invention speaker cone units have radial segments that are arcuated and have concentric arc ribs on each segment. The present invention speakers also have a central dome-shaped diaphragm that has a plurality of pie-shaped segments. The aforementioned arc ribs act to maintain stiffness outwardly on each segment during sound (wave) propagation, which in turn, surprisingly enhances sound quality and range.

b. Description of Related Art

The following patents are representative of the field pertaining to the present invention:

U.S. Pat. No. 11,356,773 B2 to provides a method comprising inputting into a first layer of a neural network at least one data sample of a current displacement of one or more moving components of a loudspeaker and at least one or more other data samples of one or more prior displacements of the one or more moving components. The method comprises generating in the first layer a data vector by applying a nonlinear activation function based on the at least one data sample of the current displacement and the at least one or more other data samples of the one or more prior displacements. The method comprises inputting into a second layer of the neural network the data vector and applying an affine transformation to the data vector. The method comprises outputting a prediction of a current voltage to apply to the loudspeaker based on the affine transformation applied to the data vector.

U.S. Pat. No. 11,012,773 B2 to describes a waveguide for controlling sound directivity of high frequency sound waves generated by a speaker driver. The waveguide is positioned in front of the speaker driver. The waveguide comprises one or more ridge areas, one or more recess areas, and one or more smooth surfaces. Each smooth surface connects a ridge area to a recess area to create a smooth transition between the ridge area and the recess area without any seams or sharp transitions. The waveguide shapes propagation of the sound waves to provide a smooth off-axis frequency response for the sound waves.

U.S. Pat. No. 8,761,425 B2 to describes an acoustic transformer that includes at least one outer boundary wall. A plurality of inner walls are disposed within the outer boundary wall. The outer boundary wall and the inner walls define a substantially annular input opening divided by at least some of the inner walls into a plurality of circumferentially-spaced input sections. Each of the input sections has an inner circumferential side and an outer circumferential side. A substantially rectangular output opening is divided by at least some of the inner walls into a plurality of output sections. Each of a plurality of acoustic paths interconnects a respective one of the input sections with a respective one of the output sections. Each of the paths has a substantially equal path length and a substantially equal expansion rate.

U.S. Pat. No. 8,265,332 B2 to teaches a speaker diaphragm with a circular opening in a center zone thereof has a pattern of concave and convex sections formed on a front surface or a rear surface thereof. A plurality of concave and convex sections are formed in each of regions provided at a regular interval with a specific angle in a circumferential direction of the diaphragm. The concave and convex sections formed in each region have different sizes in a radial direction of the diaphragm. The concave and convex sections formed in adjacent regions are displaced from each other in the radial direction. The concave and convex sections formed on the diaphragm are aligned on at least a first and a second imaginary curved line, respectively, each imaginary curved line passing regions and approaching an inner periphery of the circular opening from an outer periphery of the diaphragm.

U.S. Pat. No. 8,213,658 B2 to describes an acoustical horn having an inlet or throat, and an outlet or mouth wherein the shape of at least a portion of the horn between the throat and the mouth is defined by an exponential function including a negative exponential term.

U.S. Pat. No. 8,208,679 B2 to teaches a transducer membrane that enhances sound reproduction. Curved portions of the membrane periphery contribute to the enhanced sound reproduction. The transducer membrane may add or improve sound reproduction capability in cell phones, gaming systems, personal data assistants, or other devices.

U.S. Pat. No. 7,711,137 B2 to teaches a transducer that generates acoustic energy and is suitable for incorporation into any device that needs sound reproduction capability, including devices with generally rectangular geometries such as cell phones, PDAs, and portable gaming devices. The transducer includes a displaceable membrane with a deformable corner. The deformable corner may extend the frequency range over which the transducer generates acoustic energy without distortion. The deformable corner may be part of a membrane periphery around the displaceable membrane. The membrane periphery may be square, triangular, or may take any other polygonal shape.

U.S. Pat. No. 7,315,628 B2 to provides a diaphragm for a loudspeaker which suppresses divided resonance and shows a stable sound-pressure-frequency characteristic, and a loudspeaker using the diaphragm. The diaphragm includes three or more thick parts (11*c*) of odd numbers formed radially from a center part to an outer periphery, and semi thick part (11*d*) formed between the thick parts so as to become thinner gradually from the outer periphery to the center part. Web shaped thin part (11*e*) is formed at an inner part of the semi thick part.

U.S. Pat. No. 6,650,760 B1 to teaches an upper base/low mid loudspeaker that includes a conical driver and a channel defined by a housing and a central member. The central member has a portion extending into the cone to form a first generally ring-shaped region whose cross-sectional area increases in the direction of sound propagation. A second generally ring-shaped region is defined between a portion of the housing and a portion of the central member. The cross-sectional area of the second region decreases in the direction of sound propagation. The channel continues with a throat and a horn.

U.S. Pat. No. 6,474,440 B2 to describes a diaphragm for a speaker and a speaker device, a frequency characteristic as well as the endurance against input of which are improved. A convexo-concave portion is radially formed at a neck of the diaphragm, which is stuck to a voice coil bobbin, to increase an adhesion area of the neck itself, thereby the endurance against input is improved. In addition, the neck is stuck to the voice coil bobbin by an adhesive to increase the mechanical strength of the neck itself, thereby a frequency characteristic as well as the endurance against input are improved.

U.S. Pat. No. 6,466,680 B1 to teaches a high-frequency cinema loudspeaker module for deployment behind a perforated cinema screen that is configured with a waveguide to compensate for the beam-spreading effects of the perforated screen at the high end of the frequency range and to facilitate and co-ordinate integration with a complementary midrange module of a total sound system in providing defined coverage in a theater. A compression driver is coupled to a waveguide that is specially shaped to narrow the horizontal beamwidth at the higher frequencies affected by the perforated screen, and thus provide compensation that results in a more uniform overall defined sound coverage in the theater within the designated high-frequency range. The module is configured with the driver and waveguide axes inclined downwardly at an angle of 6 degrees from horizontal to facilitate overall coverage.

U.S. Pat. No. 6,343,133 to describes a loudspeaker system of improved clarity, coherence and uniformity of energy distribution containing mid frequency sound chambers with an annular input and approximately rectangular output for use in multi-way co-axial horn loaded line array systems. The sound chambers propagate the annular mid frequency sound wave co-axially with a high frequency sound wave, gradually changing the cross section of the mid frequency wavefront resulting in co-linear acoustic mid and high frequency wavefronts from multiple devices which range from the shape of a flat ribbon to that of a curved ribbon. The sound chambers may be arrayed contiguously and placed at the entrance of a suitable waveguide to form a wide band width acoustic line source of extended length and controlled beamwidth.

U.S. Pat. No. 6,134,337 to Takashi Isaka describes a loudspeaker, a diaphragm is equally divided circumferentially into a plurality of regions which have the same shape with each other. Each of the divided regions is formed by a hyperbolic paraboloid. The hyperbolic paraboloid is obtained by moving a straight line connecting between two segments along these two segments. The hyperbolic paraboloid is large in strength and can suppress generation of the dividing vibration of the diaphragm.

U.S. Pat. No. 6,028,947 to the present inventor, Alexander Faraone, describes a waveguide device having a body of molded, foam plastic with a speaker end and an open end and an even number of segments with a flat surface in a plane parallel to the speaker end. The segments have inside wall surfaces which flare increasingly outwardly from the speaker, and these inside wall surfaces have a speaker end length, L.sub.1, determined by the following formulas, L.sub.1 minimum=0.7.times.w.sub.s/0.0012 g/cm.sup.3.times.1/A.sub.SE, and L.sub.1 maximum=1.2.times.w.sub.s/0.0012 g/cm.sup.3.times.1/A.sub.SE, wherein L.sub.1 is a straight line length of the lower portion of the segment wall surface, w.sub.s is the weight of a speaker cone in grams/cm.sup.3, and A.sub.SE is the cross-sectional area of the speaker end in square centimeters. The waveguide body also includes an end plate with a speaker face and anchor inserts for attachment of a speaker thereto. The anchoring inserts are embedded in the waveguide body.

U.S. Pat. No. 6,026,929 to the present inventor, Alexander Faraone, teaches an improved high frequency acoustic speaker center cone, which may be located at a speaker coil tubular support, tube wherein the cone has a plurality of thin, pie-shaped segments radiating outwardly with each of the segments having an arcuated cross-section, so as to create a convex shape towards its center. The segments are highly concave toward the center and less concave with increasing radial distance away from the center. The width of the segments may increase linearly with radial distance so as to create a constant acoustical resistance radially. The center cone also has a thickness gradient with increasing thickness radially towards its center. In another embodiment, the present invention is directed to a system containing both the aforesaid center cone, an outer cone with similar radial characteristics but being concave towards its center. The segments of the outer cone preferably terminate at a flexible, high sound absorption ring. The center cone fits within an orifice at the center of the outer cone.

U.S. Pat. No. 5,991,421 to the present inventor, Alexander Faraone, teaches a waveguide for an acoustic speaker having a predetermined cone weight. The waveguide body has a speaker end and an open end and an even number of segments with a flat surface in a plane parallel to the speaker end. The segments have inside wall surfaces which flare increasingly outwardly from the speaker, and these inside wall surfaces have a speaker end length, L.sub.1, determined by the following formulas, L.sub.1 minimum=0.7.times.w.sub.s/0.0012 g/cm.sup.3.times.1/A.sub.SE, and L.sub.1 maximum=1.2.times.w.sub.s/0.0012 g/cm.sup.3.times.1/A.sub.SE, wherein L.sub.1 is a straight line length of the lower portion of the segment wall surface, w.sub.s is the weight of a speaker cone in grams/cm.sup.3, and A.sub.SE is the cross-sectional area of the speaker end in square centimeters. Each of the segment inside wall surfaces has an outer end length L.sub.2 which has a predetermined length related to L.sub.1. There is an angle between the straight-line length of the lower portion of the segment wall surface and a center line running down the center of the length of the waveguide, referred to as angle A, which is no greater than 15 degrees.

U.S. Pat. No. 5,880,412 to the present inventor, Alexander Faraone, describes an improved high frequency acoustic speaker center cone, which may be located at a speaker coil tubular support, tube wherein the cone has a plurality of thin, pie-shaped segments radiating outwardly with each of the segments having an arcuated cross-section, so as to create a convex shape towards its center. The segments are highly concave toward the center and less concave with increasing radial distance away from the center. The width of the segments may increase linearly with radial distance so as to create a constant acoustical resistance radially. In another embodiment, the present invention is directed to a system containing both the aforesaid center cone, an outer cone with similar radial characteristics but being concave towards its center. The segments of the outer cone preferably terminate at a flexible, high sound absorption ring. The center cone fits within an orifice at the center of the outer cone.

Notwithstanding the prior art, the present invention is neither taught nor rendered obvious thereby.

SUMMARY OF INVENTION

The present invention relates to an acoustic speaker cone unit for conversion of electromechanical energy to a broad range of audio frequency sounds. It is preferably made of plastic, and most effectively made of polyvinyl chloride. The present invention acoustic speaker cone unit is a single, unistructurally formed cone unit that includes: a) a suspension ring having a flat outer rim edge and a flat inner rim edge, and having at least one continuous loop rib; b) a central dome shaped cone having a plurality of thin, pie-shaped segments which radiate outwardly from the center of said central diaphragm, all of said segments having an arcuated cross-section, thereby creating a concave side and a convex side to each such segment, all of said concave sides facing one direction and all of said convex sides of said segments facing an opposite direction, and wherein all of said arcuated segments have a highly concave cross-section toward said central diaphragm center and a less concave cross-section with increasing radial distance away from said center, and wherein said central diaphragm is convex towards said center, and wherein said central diaphragm has a base wall extending downwardly from said pie-shaped segments and connected to a plurality of segments of a main diaphragm; and c) a main diaphragm having a plurality of main diaphragm segments radiating outwardly from said main diaphragm and extending to said inner edge of said suspension ring, each of said main diaphragm segments having an arcuate cross-section, thereby creating a concave side and a convex side to each such segment, all of said concave sides of said main diaphragm segments facing one direction and all of said convex sides of said segments facing an opposite direction, and further wherein said main diaphragm segments have a highly concave cross-section towards center and a less concave cross-section with increasing radial distance away from its center, and wherein each main diaphragm section has a plurality of arcuate ribs, positioned concentrically relative to one another.

In some preferred embodiments, the present invention acoustic speaker cone unit has an even number of main diaphragm segments. In some preferred embodiments, there are ten to thirty main diaphragm segments, and most preferably fourteen to twenty-two main diaphragm segments. In one ideal arrangement, there are eighteen main diaphragm pie-shaped segments.

In some preferred embodiments, each of said plurality of main diaphragm segments has at least two arc ribs, and further, wherein the number of arc ribs on each increase with increasing size of said acoustic speaker, preferably, each has four to ten arc ribs. Most preferably, each has four to six ribs.

In some preferred embodiments, the present invention acoustic speaker cone unit main diaphragm segment arc ribs have semi-circular cross-sections. They alternatively could have partial rectangular, semi-oval or other shapes, semi-circular and semi-oval being preferred. In general, the main diaphragm segment arc ribs have a sequentially increasing size as determined radially from center outwardly. Also, the main diaphragm segment arc ribs will have a sequentially increasing size as determined radially from center outwardly wherein said size is increasing linearly with increasing radial distance. For example, a five inch speaker may have five arcuated ribs, while a twelve inch speaker may have 10 to 15 arcuated ribs.

In some embodiments, the present invention acoustic speaker cone unit main diaphragm segments each have at least one radial rib that intersects at least one of said concentric arc ribs.

In some preferred embodiments, the present invention acoustic speaker cone unit main diaphragm segments have a lessening concave cross-section with increasing radial distance from the center of the cone whereby the width of the segment increases linearly with increasing radial distance so as to create constant acoustical resistance radially.

In some preferred embodiments, the present invention acoustic speaker cone unit has at least one continuous loop rib of said suspension ring is a single continuous loop rib, and may have multiple continuous loop ribs. In some preferred embodiments, a single continuous loop rib is located on said ring inner edge of said suspension ring. Although round is preferred, the suspension ring has a shape selected from the group consisting of round, oval, rectangular and polygon.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 9 shows a front view of a segment of a present invention cone unit illustrating ribs, dome and suspension ring, and FIG. 10 shows a side view thereof illustrating the relative geometry of the suspension ring, the main diaphragm and the central dome-shaped cone;

DETAILED DESCRIPTION OF THE EMBODIMENTS

Figure 1:
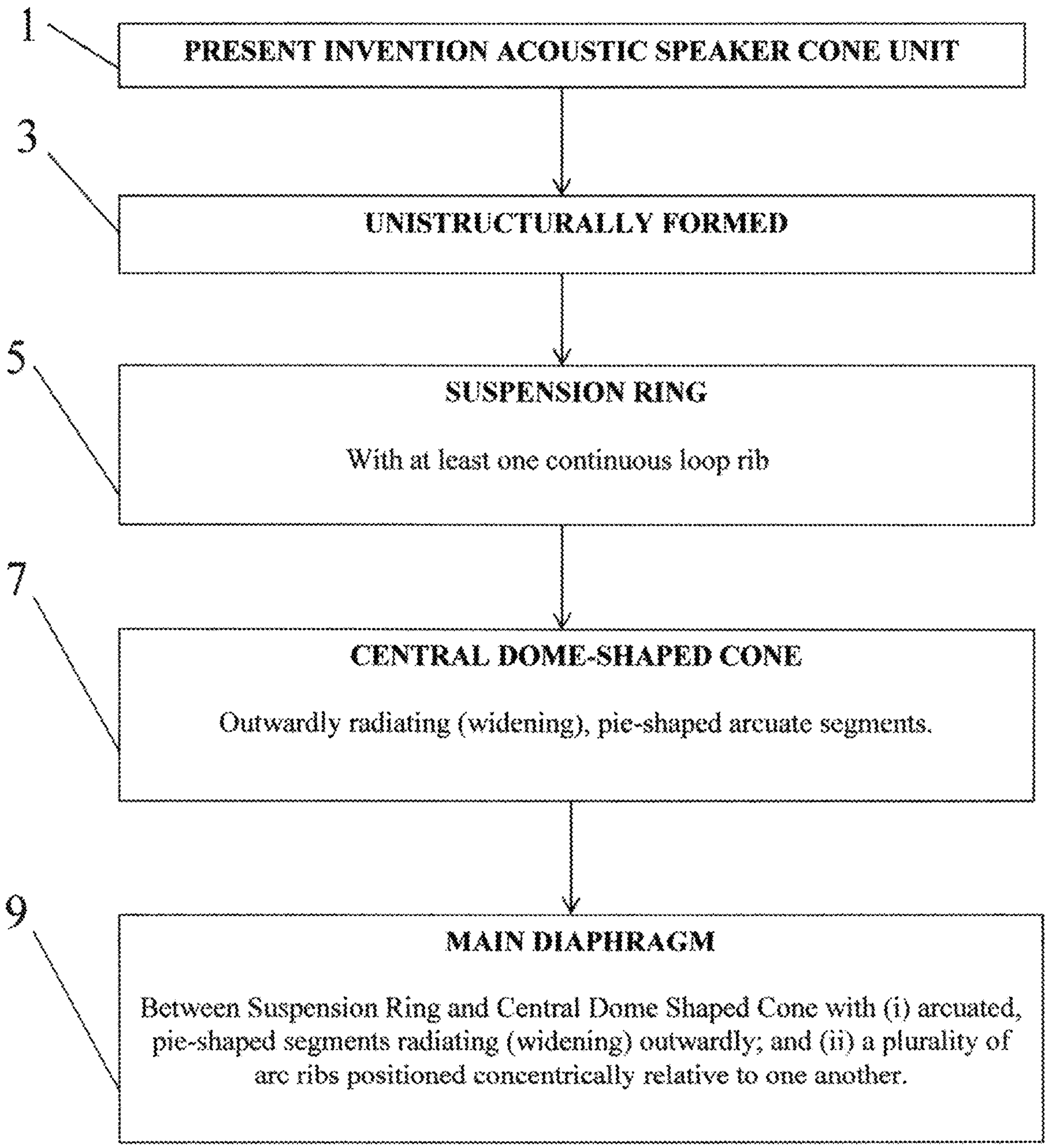
FIG. 1 is a block diagram showing some of the features and options of the present invention cone units.

The present invention system (preferred embodiment's are referred to as the Alpha Omega Speaker System) is a totally new concept in loudspeaker design, operation and ease of manufacturing. The development of this system has made it possible for a speaker system to be designed and manufactured with out the need of the many components now used in conventionally designed speaker systems.

A conventional loud speaker system designed to operate in a audio frequency range of 20 Hz to 20 k Hz will use many components to produce the range of sound that is generated by the present invention acoustic speaker cone units.

For Example, some of the components in prior art high end speaker systems may consist of 1—High Frequency Driver; 2—Med Frequency Driver; 3—Low frequency bass Driver; 4—Sub bass driver system and amplifier; 5—Cross over network; 6—Digital audio signal processing; and 7—Digital audio signal processing amplifier. In contrast, due to the unique broad frequency range of the present invention speaker cone units, a complete system may be assembled using only one or more full range drivers, utilizing the present invention single one piece molded plastic unit. The unit consists of three sections. In the most preferred embodiment, the main section consists of 18 radially arcuated pie-shaped segments with strategically located stiffening, concentric ribs that are molded into each segment, a high frequency center dome and a suspension ring, each of which have unique features described below. The molded unit may be mounted into a conventionally designed speaker basket & magnet structure with spider and voice coil/former. The present invention molded one piece unit is driven by a conventional single layer voice coil wound on aluminum former with spider.

The voice coil former and spider assembly may be installed in the center of the back of the unit with epoxy. A fixture can be used to hold voice coil assembly and present invention cone in place so they are perfectly perpendicular to each other and centered while epoxy is curing. A speaker assembly of this type can be configured to be a self centering device. The outer rim of the support ring will have at least four small holes placed evenly apart. The holes will be aligned with four shallow pins the size of the support ring holes that are part of the basket rim. Once the assembly is aligned with pins it can be glued down on basket rim and rim gasket glued in place the assembly is complete. The rim gasket can also be glued to the cone unit before the entire unit is assembled into the speaker basket.

To understand the present invention speaker cone unit operation and its contribution to diaphragm design technology, one must understand conventional direct radiating speaker system design and diaphragm or cone technology and its operating complexities and faults. All conventional diaphragms or cones are designed to operate as one thing: a piston to vibrate the air to produce sound. In speaker assemblies, to qualify as true piston, all areas of the cone must move in and out at the same time and in phase with its electrical input at all audio frequencies. In order for the cone unit to operate as a piston at all audio frequencies, it would have to be infinitely stiff and weigh nothing. The industry recognizes that this is impossible. To partially deal with this problem, conventional diaphragms are made to operate as a piston in a specific band of audio frequencies. The higher the band of frequencies the smaller and lighter the diaphragm and voice coil. The lower the band of frequencies the larger and heavier the the diaphragm and voice coil. A passive crossover is used to divide the different band of audio frequencies to each speaker driver. Passive crossover networks can be designed as a two way crossover for high and mid band frequencies. Three way crossover for high, mid and low band frequencies. Four way crossover for high, mid, low and sub band frequencies. To achieve a smooth frequency response, each driver will have to produce the same sound pressure level. In some speaker system designs the sound pressure level is adjusted in the crossover network and contributes to a more costly crossover network.

The next consideration is Time Delay Phase Distortion in conventional speaker systems. Time delay distortion is when the sound leaving the diaphragm of each driver is not in sync with its program input signal. The listener is not hearing the program as it was originally produced or recorded. The root cause of this problem can be very complex and can be caused by many different factors. This problem may be electrical and/or mechanical. For example—in electrical causation, the crossover network uses components that store energy and release energy. The time it takes to store and release this energy is determined by the band of audio frequencies it is passing. As the frequency band gets higher, the less time it takes to store and release energy. In a three way crossover it would have it would have three different values of time delay phase distortion. Because of the different impedance of each driver in the system and phase shift caused by the crossover network, it presents a difficult and complex impedance load for the amplifier. This problem leads to poor power distribution and high power draw in low and sub band frequencies.

The mechanical problems that cause time delay phase distortion are more complicated. Each driver in a system as explained earlier is designed to reproduce a different band of audio frequencies. The higher the frequency band, the smaller the driver and voice coil. In each driver, its voice coil is what drives its diaphragm or cone to produce sound. Since the drivers of each band of frequencies are of different size there voice coils are in different positions when mounted into the flat surface of a speaker enclosure.

The different positions of the voice coil is another cause of time delay distortion. Some manufacturers correct this problem by a technique called time alignment where each driver is positioned vertically and stepped back as needed to align voice coils. This would be done using a specially designed speaker enclosure. This technique of time alignment will only work when the listener is on axis of the speaker system, and falls apart as listener moves off axis left or right of the speaker. It should be noted that alignment of the voice coils is not the only thing to contend with when configuring time alignment.

The following is a more detailed explanation of time delay phase distortion and time alignment. The velocity of sound in various materials used in conventional speaker diaphragms or cones time delay phase distortion and time alignment problems. The velocity of sound in air at 20 degrees centigrade is 34,400 cm per sec. The velocity of sound in solid materials used in speaker diaphragms and cones is much faster and varies depending on what material is being used. The variation of sound velocity in a speaker system that uses different diaphragm or cone material for its drivers is another form of time delay phase distortion.

When configuring time alignment each driver must be measured for its time delay in air. Time delay testing requires electronic test equipment that will measure the time it takes a pulsed signal from the speaker to reach a test microphone at a given distance. As indicated earlier, time alignment correction can only be applied to on-axis listening of the speaker system. Also, the sound pressure level of each driver must be adjusted to compensate for its displacement.

The off-axis response of a conventional loudspeaker or speaker system deals with a more complex set of problems.

Irregular off-axis response of a conventional speaker or speaker system are time delay phase distortion and varying sound pressure level at different frequencies. These problems can not be corrected because they are part of the mechanical function of the of a conventional speaker diaphragm or cone in a speaker system. For example, the sound being heard off-axis of a conventional speaker system using two three or four different drivers is leaving at different locations of the drivers in the system. The sound heard at the listener's ear is arriving separately at two three or four different delayed times. Even if the the drivers are electronically time aligned the problem still exists off axis. Another source of this problem is the different velocities of sound on the diaphragm or cone being used for the different band of audio frequencies.

As mentioned above, conventional diaphragms or cones are designed to operate as a piston. This piston function is only true at the lowest frequency of each band of frequencies that the diaphragm or cone is trying to reproduce. The different velocities of sound produced also exist on the diaphragm or cone. This is another source of time delay phase distortion and sound pressure level variation in the off axis response of the speaker or speaker system. When the diaphragm or cone is not operating as a piston to produce sound, sound is produced by mechanical waves generated by the voice coil on the surface of the diaphragm or cone. The length of these waves are determined by its frequency, velocity of sound of the diaphragm or cone material and its mass. As the frequency increases the wave length get shorter. As the frequency deceases the wave length gets longer. At its lowest operating frequency at a quarter wave length of that frequency is equal to the diameter of the diaphragm or cone. At this frequency the diaphragm or cone is operating as a piston with its whole surface area moving in or out at the same time. When the diaphragm or cone is operating with waves produced on its surface it is operating as a transmission line. For example, with a speaker cone, the smaller end of the cone is attached to the voice coil and the larger end is terminated to a flexible suspension. The waves on the cone are produced by the driving positive and negative forces of the voice coil at the smaller end of the cone. These waves travel from the smaller end of the cone to the larger end. As the wave travels on the cone, it is producing sound waves in air. The sound waves produced in air by the cone should arrive to a point that is parallel to the face of the cone in phase for each frequency it is trying to reproduce. For a conventional speaker cone this is not possible. This is due to the change in velocity of sound waves moving on the surface of the cone.

This is caused by the increase of cone mass encountered by the voice coil and different velocities of sound waves traveling on the surface of the cone. As the frequency decreases, its velocity decreases and the wave length is shorter. As the sound is produced in air from the cone, the decreasing frequencies are delayed. This problem is in direct relationship to the geometry of the cone and varies to a more or lesser degree depending on the size and depth of the cone. The different velocities of sound produced also exist on the diaphragm or cone.

To a listener this delay of frequencies is perceived as a higher pitch sound with the highest frequencies reaching the listeners ear first and decreasing frequencies lagging behind. When the listener is off axis of the speaker the sound is perceived as a lower pitch with the lower frequencies leaving at the larger radius of the cone and arriving at the listeners ear first with the higher frequencies lagging behind. Thus far, this discussion has been about conventional direct radiating loudspeakers and speaker systems, their operation, and problems relating to the diaphragm and cone technology.

In the present speaker market there are many different types of speaker systems to handle different types of venues inside and outside. All of these different speaker systems have one thing in common they process the audio spectrum of sound from 20 Hz to 20 k Hz by breaking it up into 2, 3 or 4 different bands of frequencies and sending it to 2, 3 or 4 different types of speakers or drivers to deliver sound. As long as sound is processed in this manner all the problems pointed out in this discussion and others not covered will exist.

The next topic of discussion is conventional speaker system enclosures. Beside having a place to mount the speaker drivers, the main purpose of a speaker enclosure is to block the sound being produced on the back of the diaphragm or cone. Sound leaving the back of the speaker cone or diaphragm is 180 deg. out of phase with sound being produced on the front. With out the enclosure sound from the back of the speaker would bend around to the front of the speaker and ether add to or cancel out sound being produced on the front of the speaker. This problem results in non uniform frequency response of sound pressure level.

Another purpose for the speaker enclosure, is to provide a volume of air to control or dampen the inertial forces created by the moving mass of the speaker cone and voice coil. These forces are not related to the forces produced by its program input to the voice coil to produce sound. There are two types of enclosures: a sealed enclosure and a vented enclosure. A sealed enclosure is only used to provide functions as described earlier. The vented enclosure provides a third function. This function is to use the back wave of the low frequency driver or sub frequency driver to reinforce and extend the lower frequency range of the speaker system.

The frequency of the wave used to perform this function is called the resonance frequency. Resonance of a low or sub band driver is the lowest frequency that can be efficiently produced by the speaker cone. A quarter wave length of this frequency is equal to the diameter of the cone. Resonance is when the total inertial forces of the voice coil mass and cone mass are equal to the electrical forces delivered from the amplifier to the voice coil. As the voice coil approaches its resonance frequency it will start to generate voltage of its own, which is called back EMF or (Electro Motive Force). As the back EMF increases, the impedance of the voice coil increases to maximum at the resonance frequency. If the driver voice coil was rated at 8 ohms at resonance this value could increase to 4 times as much or 32 ohms. At this impedance, the power draw on the amplifier would be ¼ of its rated power at 8 ohms. Each low or sub frequency driver has a specific free air resonance frequency. To find resonance frequency, the driver must be measured out of its enclosure with no boundary around it, which defines the term (free air). A computer program and hardware is used to measure the impedance of the driver at any audio frequency or low or sub band frequencies. Once the resonance frequency is known, the box volume for a sealed enclosure or vented enclosure can be computed. For the vented enclosure the port or also called the resonance tube must be computed from the resonance frequency. Unfortunately, for conventional speaker drivers, this is not the only parameter needed to compute the box volume and port. The value of each parameter needed for each driver is unique. The parameters should be supplied by the manufacturer as part of its specifications. These parameters are called Thiele-Small parameters. Nevel Thiele and Richard Small are the two engineers that developed these parameters for conventional loudspeakers box interaction. The Thiele-Small parameters and the formulas to compute the box volume and port resonance tube are very complex. They do not always work one hundred percent even with the aid of a computer program. The main problem that led to this complexity is that the parameters were created with the assumption that the conventional speaker cone operates as a true piston. In reality this is not so, since it is a cone shape being driven at one end and not a flat surface being driven at all areas in and out at the same time.

Having considered various aspects of conventional speaker systems enclosures, the present invention is now addressed: The present invention acoustic cone unit (including the preferential Alpha Omega speaker unit) was developed to correct the many problems dealing with conventional speaker systems described above, as well as cone technology and the manufacturing process.

First, the present invention cone unit. This type of diaphragm is not designed to operate as a piston at any frequency. The operation of the present invention is a mechanical wave transmission line. The mechanical wave on the present invention cone unit mimics the wave as it is produced electrically and acoustically in air.

The present invention unit provides two modes of operation at the same time. Operation one is to provide a constant mechanical load for the voice coil throughout its frequency range. This operation also provides a constant impedance load for the amplifier. Since the speaker is driven directly from the amplifier, signals are totally in phase with its program source. Operation two provides a matching acoustical resistance or load for air at any frequency wave length. The main diaphragm and central dome-shaped cone provide a constant velocity wave propagation which results in a phase coherent wavefront. The coherent wavefront transitions into a spherical wave pattern which remains in phase on and off axis at all frequencies. This coherent wave pattern provides a perfect coupling of sound when two speakers are used side by side resulting in a full 6 db increase in sound pressure level at all operating frequencies. The sound from two speakers is much more than an increase in level but is also an increase in intensity and detail as if it was originating from one source producing a large wall of sound.

In the center of the main diaphragm is the high frequency dome-shaped cone. The dome-shaped cone has eighteen convex radial arcs molded into its surface. The arcs provide three functions. One, is rigidity of the dome. Two, is a wave propagation point in between arcs starting nearest the voice coil to top of the dome. Three, is a wave guide to to control high frequency sound wave dispersion pattern to match the dispersion of sound from the main diaphragm.

The diameter of the voice coil is what dictates the diameter of the high frequency central dome-shaped cone and its lower cut off frequency. The main and larger part of the diaphragm provides the eighteen distribution points to feed the energy transmitted by the voice coil to all surfaces of the diaphragm. Each half arc on ether side of the concave folds receives its energy from the points nearest the voice coil and travels radially on the folds to the arc surface to produce the mechanical wave function. A specific amount of diaphragm mass for each wave length is used as needed to form the wave on the diaphragm. The ratio of mass used for one cycle of any audio frequency is 1/3.14159=0.3183 This ratio is a constant for a single sine wave whether it is electrical mechanical or acoustical. The angle of each arcuated segment is equal to the sine of 1/3.1459=sine.3183=18.56 deg. Each fold is equal to 1.5 deg. Total angle for each pie shaped segment equals 20 deg.

The angle of the fold is computed for all waves traveling radially on the diaphragm producing waves in air to arrive to a point parallel to the face of the diaphragm in phase at all frequencies. This will be called the phase angle (Pa). Pa=sine Cl/C2+sine 1/3.14159, wherein Cl=velocity of sound in air and C2=the velocity of sound of diaphragm material, and sine 1/3.14159=one cycle time ratio for any frequency. Example, Cl=34,400 cm per sec at 20 deg centigrade; C2=239,500 cm per sec. Sine Cl/C2=sine 0.14363=8.25 deg. Sine 1/3.14159=sine 0.3183=18.56 deg. Pa=8.25+18.56=27 deg.

The suspension is designed for linear motion and control of the diaphragm. The mass of the suspension is equal to the mass of the diaphragm. This one to one mass ratio is the same for any size speaker diaphragm. The curve radius of the suspension is dictated by the phase angle of the diaphragm and the center of the suspension area.

Looking at a side view a line drawn down from the center of the suspension and a second line from end of the diaphragm perpendicular to its phase angle the two lines will intersect. The distance from the intersecting lines to the end of the diaphragm is the curve radius of the suspension. The large end of the diaphragm is at the same height as the basket rim. The curve radius of the high frequency dome is dictated by the phase angle of the diaphragm which is tangent to the end of the dome. The curve radius of the convex radial arcs on the dome are dictated by the angle of the top of the diaphragm segment which is tangent to the end of the arc nearest the segment. Measurements of all masses, radius, and circumference are measured as if the diaphragm and suspension was a flat surface viewed from the front. The stiffening ribs for each segment are evenly spaced as per equal mass radially. The location of the first rib closest to the dome is at a point twice the mass of the central dome-shaped cone. The center radius of each rib is the the line where the masses meet. All the ribs except the last one are molded into the arc section of the segment. The last rib spans the full circumference of each segment. The radius of each rib increases radially with the last rib being the largest and the rib nearest the dome being the smallest. See drawing for details.

The curvature for each segment decreases radially until it reaches the the point tangent to the suspension. This is computed from the center point of the diaphragm. By dividing the outer circumference of the segment by 3.14159 this will equal the height of the segment at its center. The actual starting point is at the voice coil circumference. See the below drawings for details.

The total mass of the voice coil should not exceed the mass of the diaphragm divided by 3.14159. Former mass is equal to or less than voice coil. A copper clad edge wound aluminum voice coil is recommended with a overhang of the magnetic gap no more than one half the gap length or ¼ above and below the gap. All points of the 18 segments should be as close to the voice coil as possible dictated by the low frequency range of the speaker.

All points must be secured in place close to the spider using the spider as a ledge for the epoxy bead covering the full circumference of the voice coil former. The epoxy coating of the former will start just below the dome area. The upper frequency range of this type of speaker diaphragm design for any size speaker is 22 k Hz. The lower frequency range is dependent on the size of the diaphragm and the type of enclosure used. Also, due to the coupling effect, when two drivers are used, the lowest operating frequency range of the system will increase by one octave.

The ideal speaker enclosure for the present invention unit is a vented system utilizing a specific wave control port rather than a resonant tube as used in conventional speaker enclosure design. The wave control port is designed to operate the same way sound waves are produced by the driver diaphragm and in air. Thus, all that is needed to compute the box volume and the wave control port volume is the resonant frequency of the driver, the driver mass volume and port wall mass volume. For example, for a 15 in speaker with a resonant frequency of 39.8 Hz, the net volume of air for the enclosure would equal C1/FS divided by 2=active resonant diaphragm area. (active resonant diaphragm area) squared divided by 3.14159/2=Net enclosure volume. Total volume=Net enclosure volume+speaker driver mass volume+port wall mass volume. Cl; velocity of sound in air at 20 deg centigrade, and FS=free air resonant frequency of the driver.

3.14159/2=1.57079.

The net volume of air for this driver would equal 4.198 cu. ft. The operating range of this speaker would be 20 Hz to 22 kHz. The port is a 20 degree flat sided horn shape which spans the inside width of the enclosure. The mouth of the port is equal to the resonant active diaphragm area of the driver. The back of the horn or its apex area is equal to the resonant active diaphragm area divided by 3.14159. The vertical center of the horn is located at the bottom of the ¼ wavelength volume of air which equals the net box volume divided by 3.14159/2=1.57079 plus the driver mass volume and one side of the horn panel volume which equals the total volume. Port volume is equal to the active resonant diaphragm area in square centimeters, divided by 3.14159 times the diaphragm mass in grams per square centimeter (0.052) divided by the density of air in grams per cubic centimeter (0.0012). Divided by 16.387 for cubic inch volume.

The present invention speaker cone units for the prototype speakers were vacuum formed from a single sheet of 0.015 mil thick PVC (polyvinyl chloride) material with a gloss finish on both sides. This material has self-dampening properties, UV Ray protection, is water proof, will not deteriorate over time, and produces a well detailed product when molded. The material holds up very well to flexing for use as the suspension part of the diaphragm and will not crack. The actual computed thickness for the diaphragm was 0.013 mil. Vacuum forming is not a perfect process when uniform thickness is required, but can be overcome. There may be a variation of thickness of 6 mil+/−3 from 0.015 mil. To make up for the variation of thickness which was mostly near the center, dome area and stiffening ribs. A coating of dampening glue was added to these areas in the back of the diaphragm. The dampening glue used was light flexible and stiff when cured. A thin coating was also applied to the back curved surface of each segment.

Another molding procedure can be used but will require a male and female mold. The heated material will be compressed between the two molds down to the desired thickness. This will eliminate the variation of thickness. The material thickness before molding must be larger than the desired thickness. Peltier thermoelectric solid state heating and cooling can be Incorporated in the molds. Molds can be heated and cooled very quickly with this process to produce near perfect to perfect present invention speaker cone units.

The present invention speaker cone units and assembled systems may be used for any venue such as home stereo, pro sound inside and outside, recording studios, musical equipment, paging systems fire evacuation systems and any place a loud speaker is needed. This speaker system will provide phase coherent and accurate sound reproduction of recorded or live sound as it was produced. Any size speaker with the present invention speaker cone unit will provide the same phase coherent and accurate sound reproduction on or off axis.

Referring now in detail to the drawings wherein like reference numerals designate corresponding parts throughout the several views, various embodiment's of the present invention are shown.

Figure 2:
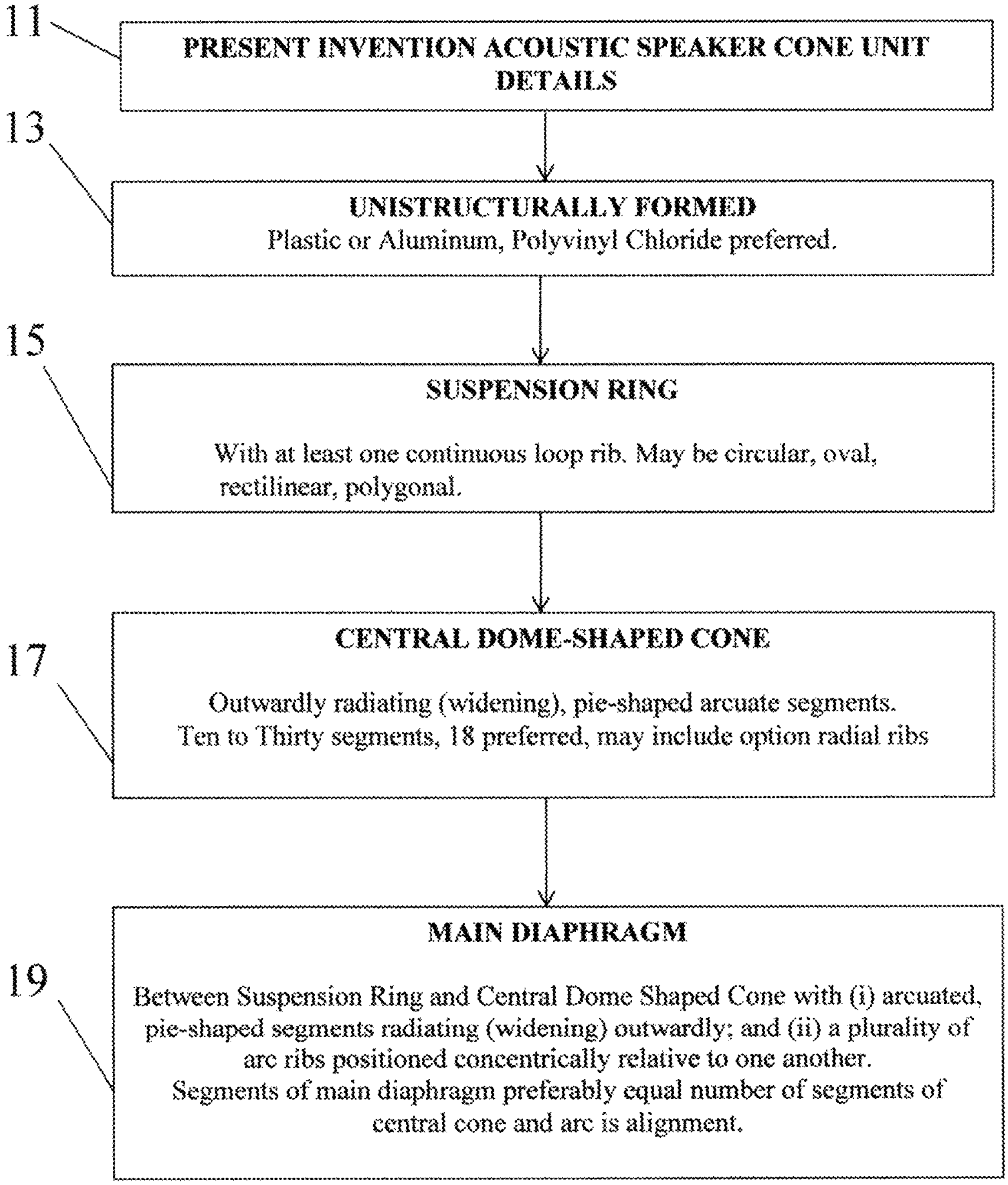
FIG. 2 illustrates a second block diagram illustrating further features of the present invention.

FIG. 1 is a block diagram showing some of the features and options of the present invention cone units, and FIG. 2 illustrates a second block diagram illustrating further features of the present invention. More specifically, FIG. 1 shows the bare bones features of the invention acoustic speaker cone unit, block 1. As stated, the unit must be unistructurally formed, block 3, to function with precise continuity of sound wave generation and transmission. The attachment (outer) component is the suspension ring, block 5, with at least one continuous loop rib. The term “ring” as used herein means the outer portion of the present invention unit that encompasses (surrounds) the main diaphragm, which in turn encompasses (surrounds) the central dome-shaped cone. Thus, the “ring” of the present invention must be a closed continuum, but need not be circular. It could be oval, rectilinear, polygonal, irregular or otherwise, but circular and oval are preferred, with circular rings being most preferred. The central dome-shaped cone, block 7, had outwardly radiating pie-shaped segments. These segments are arcuate front to back and the “tunnel” that is created radiates outwardly. The main diaphragm, block 9, also has pie-shaped arcuate segments, and these are aligned with and thus are continuing the pie shaped segments of the central cone, but clearly in a different plane with a different and varying radius of curvature.

FIG. 2 shows another block diagram setting forth additional details for the present invention acoustic speaker cone unit, block 11. It is unistructurally formed, block 13, and continuous PVC molded structures are preferred. Block 15 shows further suspension ring details; block 17 shows further central cone details and block 19 shows further main diaphragm details.

Figure 3:
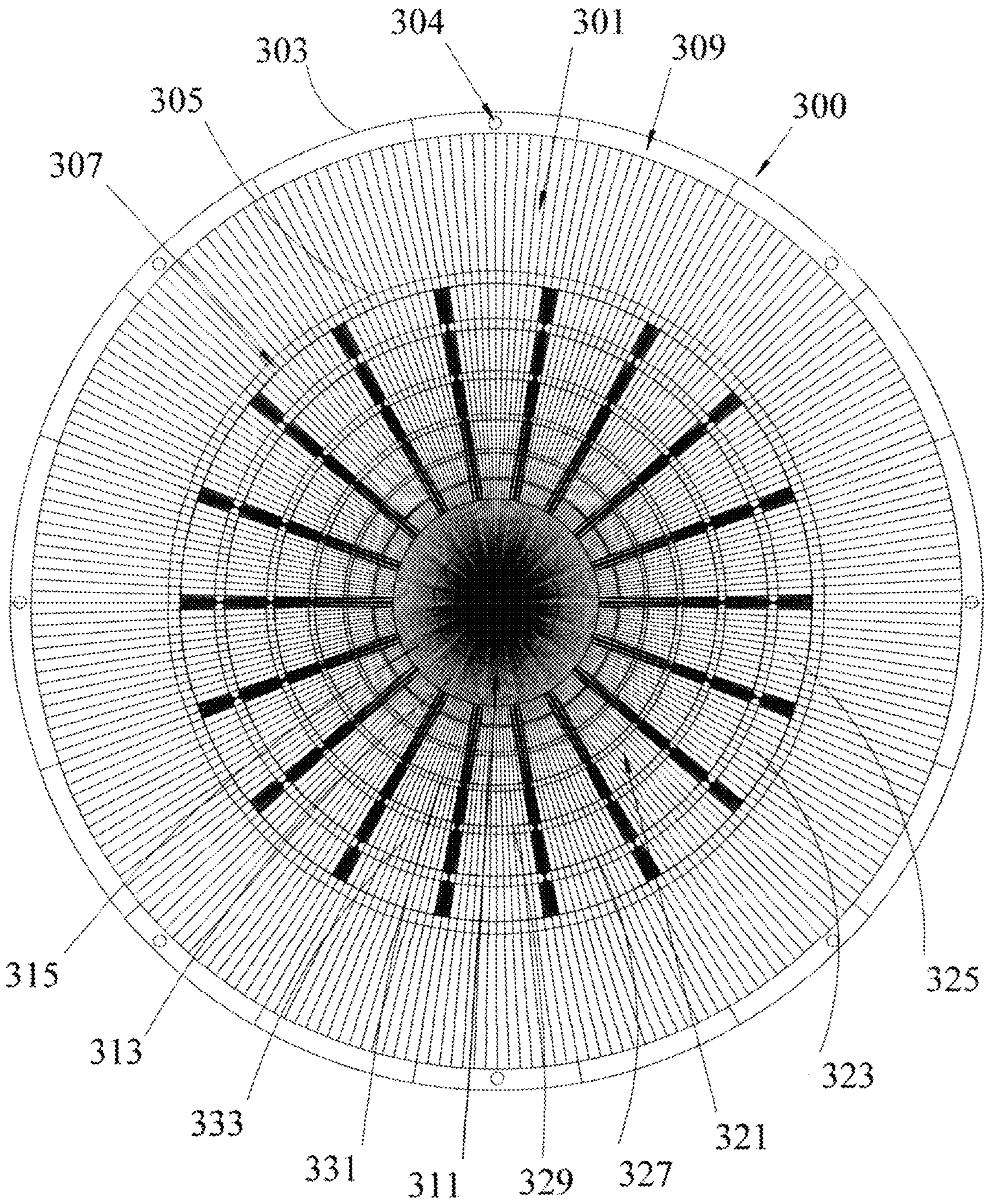
FIG. 3 shows a front view of a preferred present invention acoustic speaker cone unit.
Figure 4:
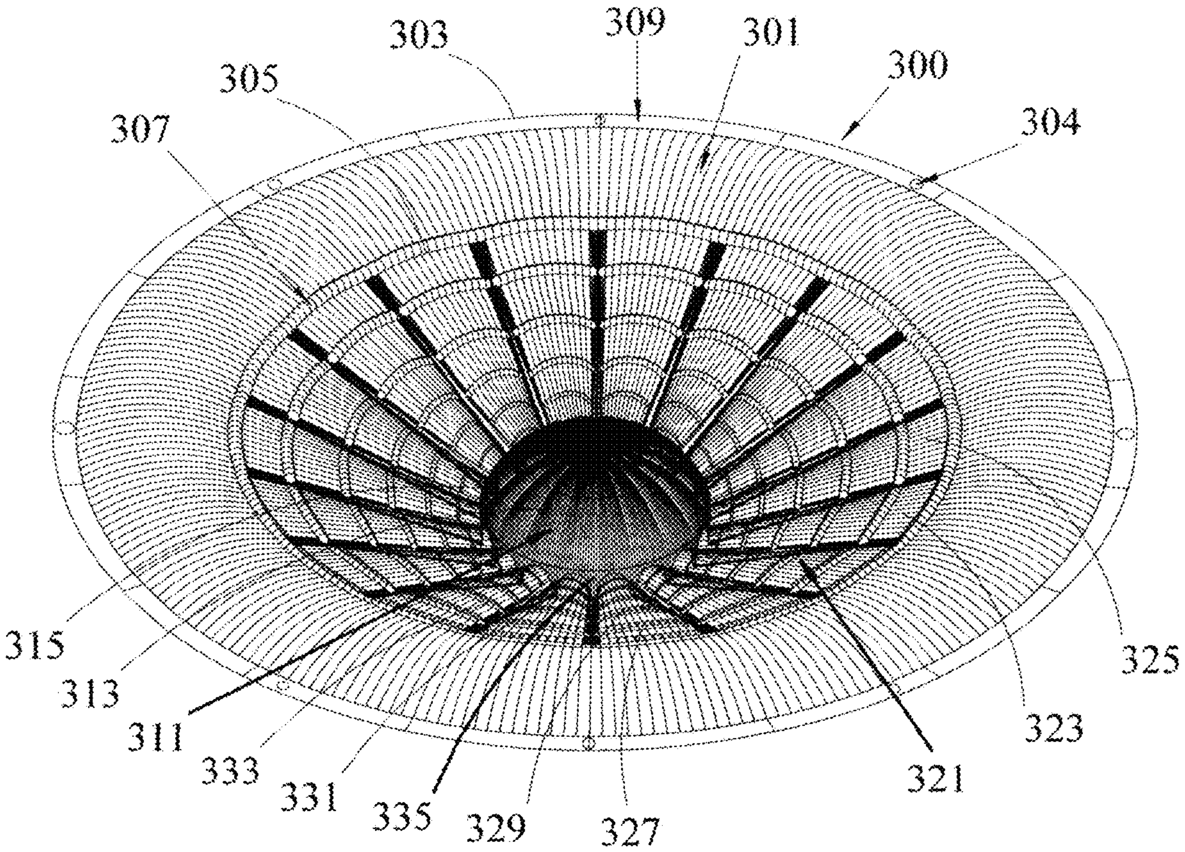
FIG. 4 shows a full isometric view of the cone unit shown in FIG. 1
Figure 5:
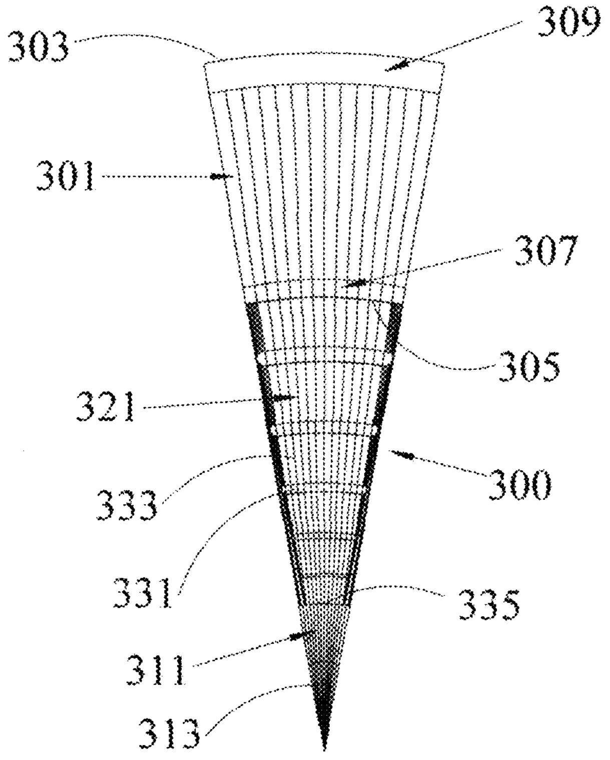
FIG. 5 shows a front view of a single segment thereof.
Figure 7:
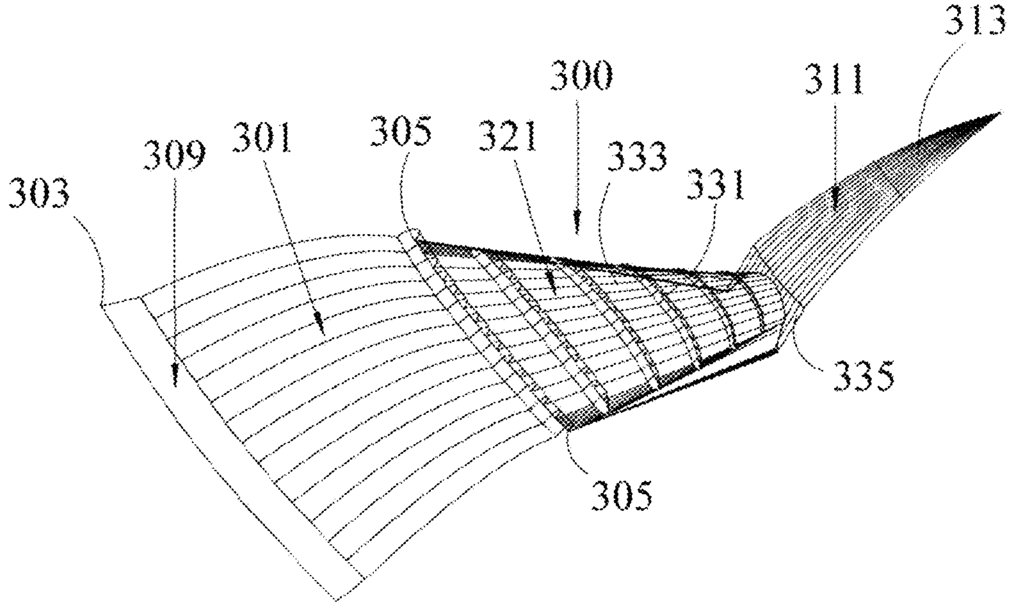
FIGS. 6 and 7 show a side view and an isometric view of the present invention cone unit segment shown in FIG. 5.
Figure 6:
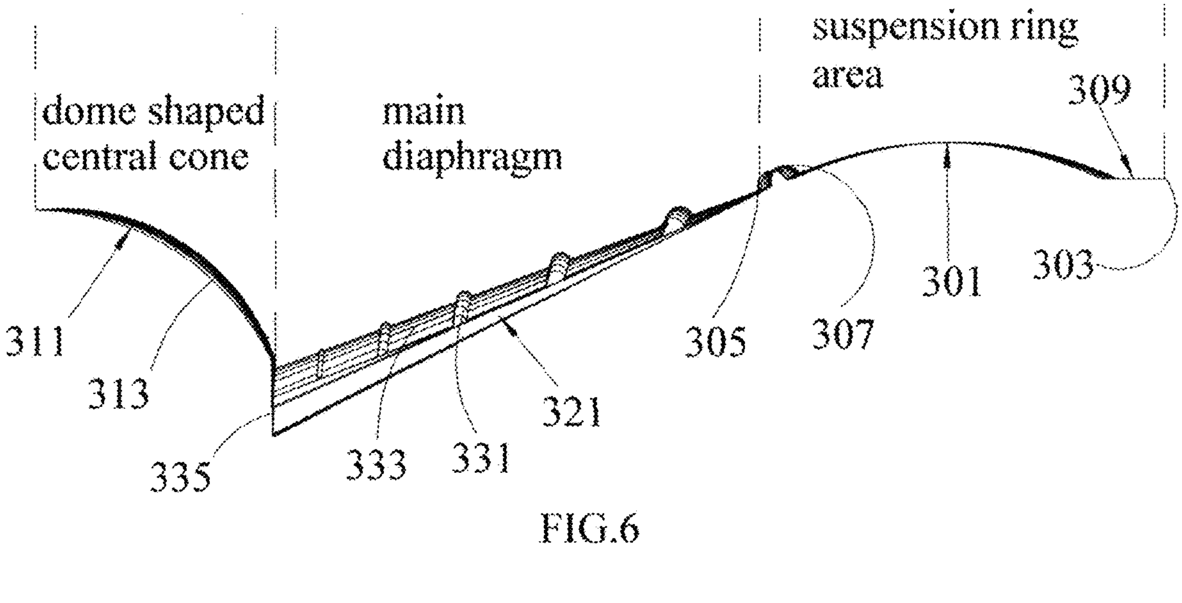

FIG. 3 shows a front view of a preferred present invention acoustic speaker cone unit 300. FIG. 4 shows a full isometric view of the cone unit 300 shown in FIG. 3 and FIG. 5 shows a front view of a single segment of cone unit 300. FIGS. 6 and 7 show a side view and an isometric view of the present invention cone unit segment shown in FIG. 5. Therefore, FIGS. 3, 4, 5, 6 and 7 are now discussed collectively and like parts are like numbered. FIGS. 3 and 4 show full views of the present invention acoustic speaker cone unit 300, with its three critical components: suspension ring 301, central cone 311 and main diaphragm 321. Suspension ring 301 includes an outer edge 303, and inner edge 305, a continuous loop rib 307 and a ring panel 309. This component is used to connect the unit 300 to a speaker basket, to suspend the main diaphragm 321 and cone 311, and to aid in precise alignment of unit 300. Speaker basket mounting screw holes 304 can be punched, drilled or formed into ring panel 309 as needed. Main diaphragm 321 has a plurality of equal size pie-shaped segments, in this case 18 such segments, as exemplified by segments 323, 325 and 333. Each of the segments have a plurality of arc ribs that are not continuous, but are concentric, and are exemplified by main diaphragm ribs 327, 329 and 331. In this embodiment, there are 5 concentric arc ribs on each pie-shaped segment. These ribs increase in size with increasing distance from the central cone 311. The ribs are semi-circular, but could be oval or rectilinear or polygonal. For surface smoothness and maximum continuity, semi-circular ribs are preferred. Central cone 311 is dome-shaped and has a plurality of arcuated pie-shaped segments, such as segments 313 and 315 that widen as they outwardly distance from the center. They terminate in a wall section 335 that is unistructurally connected to the main diaphragm 321.

FIG. 5 is a front view of one cut of segment the combined suspension ring 301, central cone 311 and the main diaphragm 321. Parts are identical from the same parts shown in FIGS. 3 and 4. The FIG. 5 presentation is rotated 90 degrees and flipped to its side in FIG. 6 to reveal the shapes of each component and the relative relationships of each component to one another. FIG. 7 shows, with the same numbering, the cut segment shown in FIGS. 6 and 7, but in an isometric view.

Figure 8:
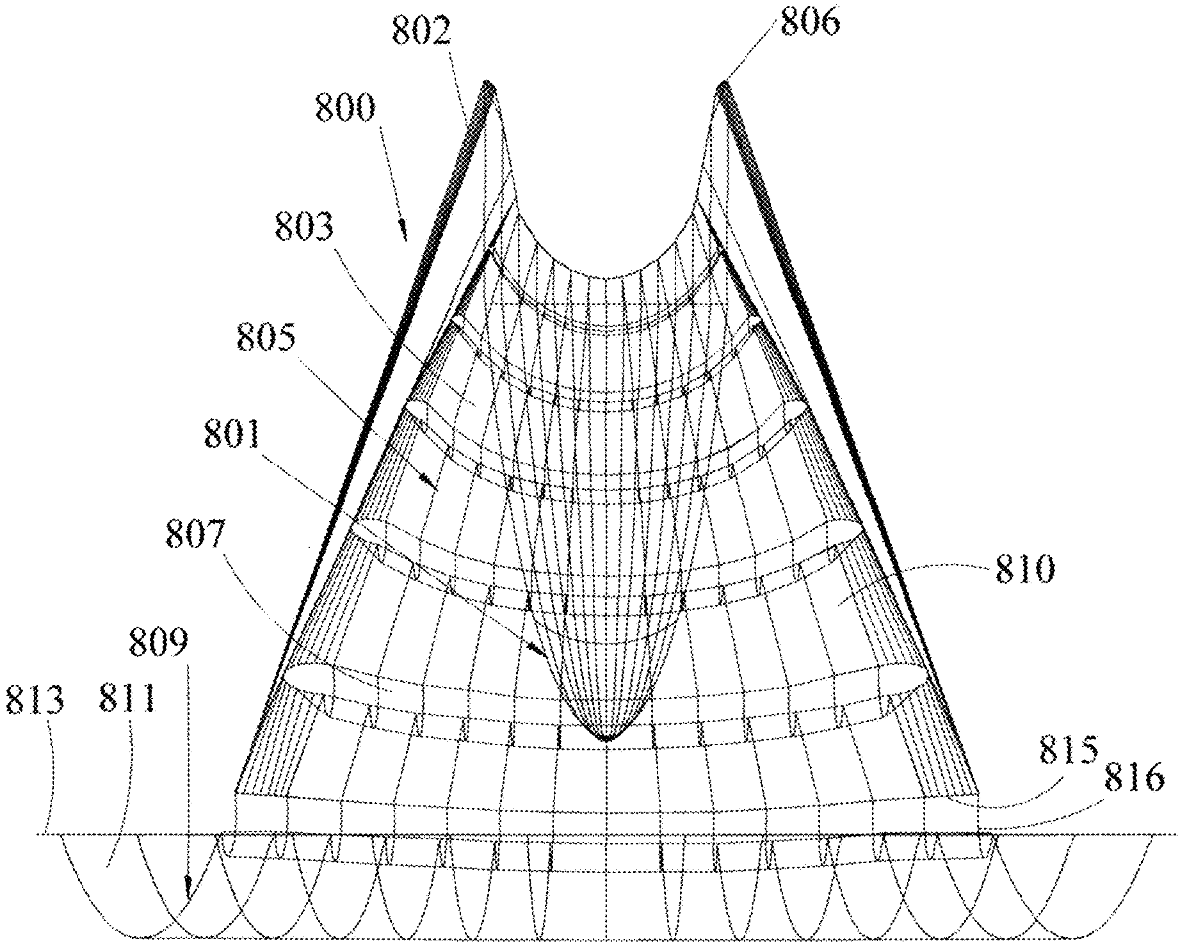
FIG. 8 shows a side, cut view of an alternative present invention acoustic speaker cone unit.

FIG. 8 shows a back view of segment as viewed from suspension side of acoustic speaker cone unit 800, and transparent view of center dome cone 801. This present invention unit 800, main diaphragm 805, and an arcuated suspension ring 809. The suspension ring has an outer edge 813, and an inner edge 815 with a continuous loop rib 816 at its inner edge 813 central dome-shaped cone 801 has a plurality of pie-shaped segments such as segment 803. Main diaphragm 805 has a plurality of pie-shaped segments, such as segment 810 and a plurality of arc ribs on each segment, such as rib 807. Between each segment 803 of main diaphragm 805 is a fold 802. The point nearest the voice coil 806 is the starting point of wave propagation for each segment 803, and to center dome cone 801 segment.

FIG. 9 shows a front view of a segment of a present invention cone unit 900 illustrating main diaphragm with ribs, dome and suspension ring, and FIG. 10 shows a side view thereof illustrating the relative geometry of the suspension ring, the main diaphragm and the central dome-shaped cone. In both Figures identical parts are identically numbered. There is a suspension ring 901, with a curved ring portion 909, ring panel 904, an outer edge 903, and an inner edge 905 with continuous rib 907. Edge 905 continues into a main diaphragm 911, with a pie-shaped segment 913, and ribs, such as arc rib 915. This extends inwardly to the dome-shaped central cone 921. FIG. 10 shows a side view thereof and has the relative special relationships illustrated. Details are set forth above the drawing descriptions, as to calculations for a given design.

Figure 12:
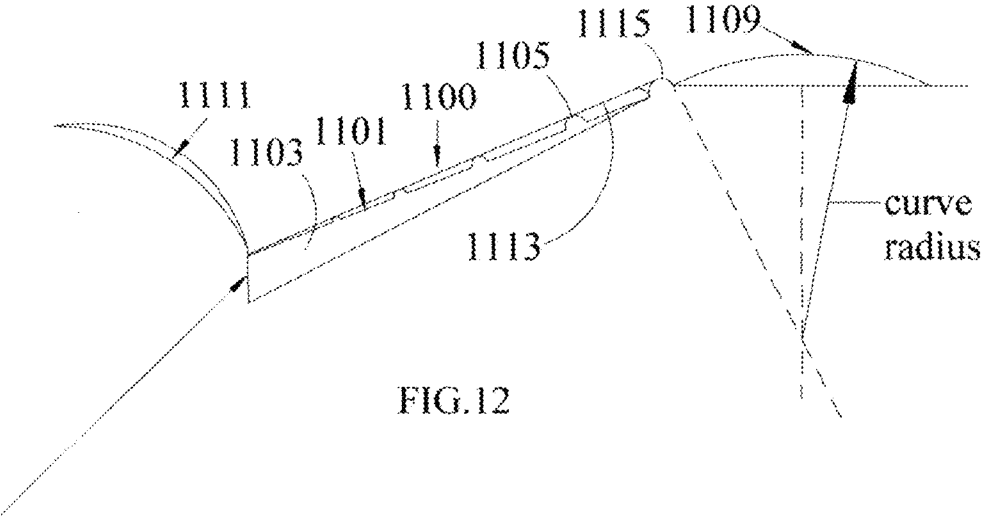
FIG. 12 shows a side view thereof illustrating the relative geometry of the suspension ring, the main diaphragm and the central dome-shaped cone.
Figure 11:
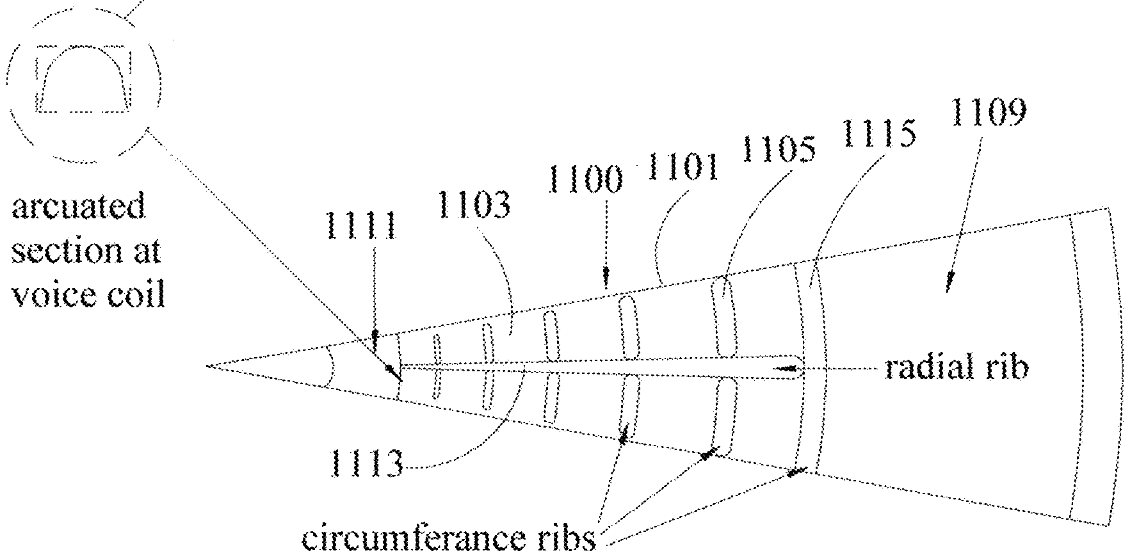
FIG. 11 shows a front view of a segment of a present invention cone unit illustrating ribs, dome and suspension ring, with a radius rib.

FIG. 11 shows a front view of a segment of a present invention cone unit 1100 illustrating main diaphragm with both concentric arc ribs and a radial rib intersecting those are ribs, and FIG. 12 shows a side view thereof illustrating the relative geometry of the suspension ring, the main diaphragm and the central dome-shaped cone. In both Figures identical parts are identically numbered. There is a suspension ring 1109, with a continuous rib 1115. The main diaphragm 1101 has a pie-shaped segment 1103, and ribs, such as arc rib 1105. There is also a radius or radial rib 1113 intersecting arc ribs. The main diaphragm 1101 extends inwardly to the dome-shaped central cone 1111. FIG. 12 shows a side view thereof and has the relative special relationships illustrated. Details are set forth above the drawing descriptions, as to calculations for a given design.

Figure 13:
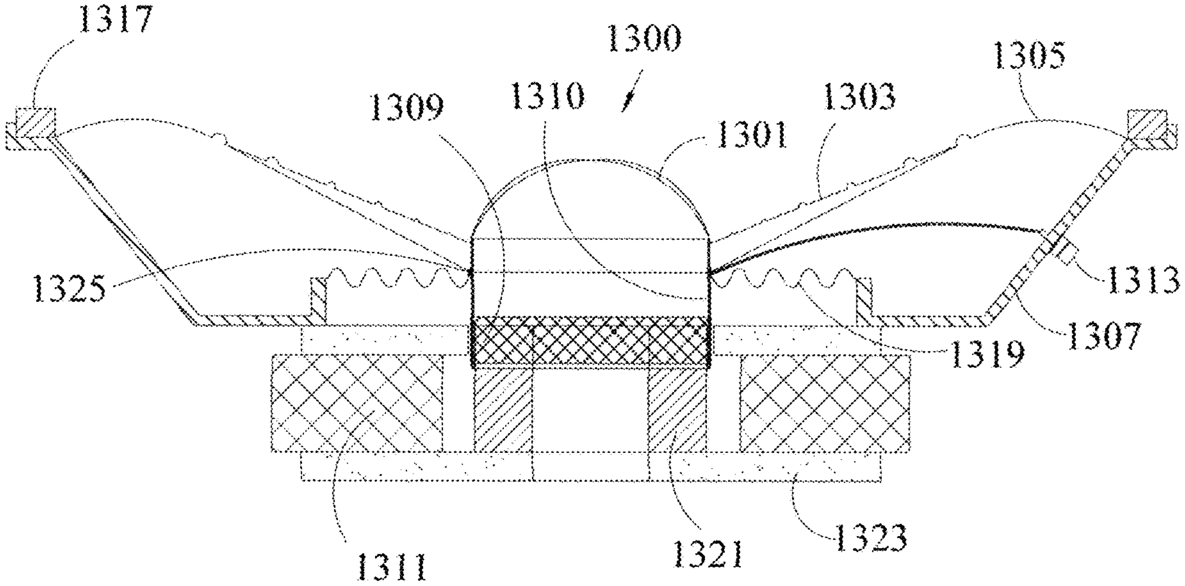
FIG. 13 shows a side cut view of a speaker driver with coil, suspension, magnet and a basket-mounted present invention acoustic speaker cone unit.

FIG. 13 shows a side cut view of a speaker driver 1300 with voice coil 1309, voice coil former 1310 up to bottom end of center dome cone 1301, suspension 1319, magnet 1311, vented pole piece 1321, vented back plate 1323, basket 1307, electrical connection 1313 and a basket-mounted present invention acoustic speaker cone unit with central cone 1303, main diaphragm 1303 and suspension ring 1305, basket rim gasket 1317, and epoxy bead 1325 applied to full circumference of coil former. This present invention unit would have the same or similar details as shown in FIGS. 3 and 4 above.

Figure 14:
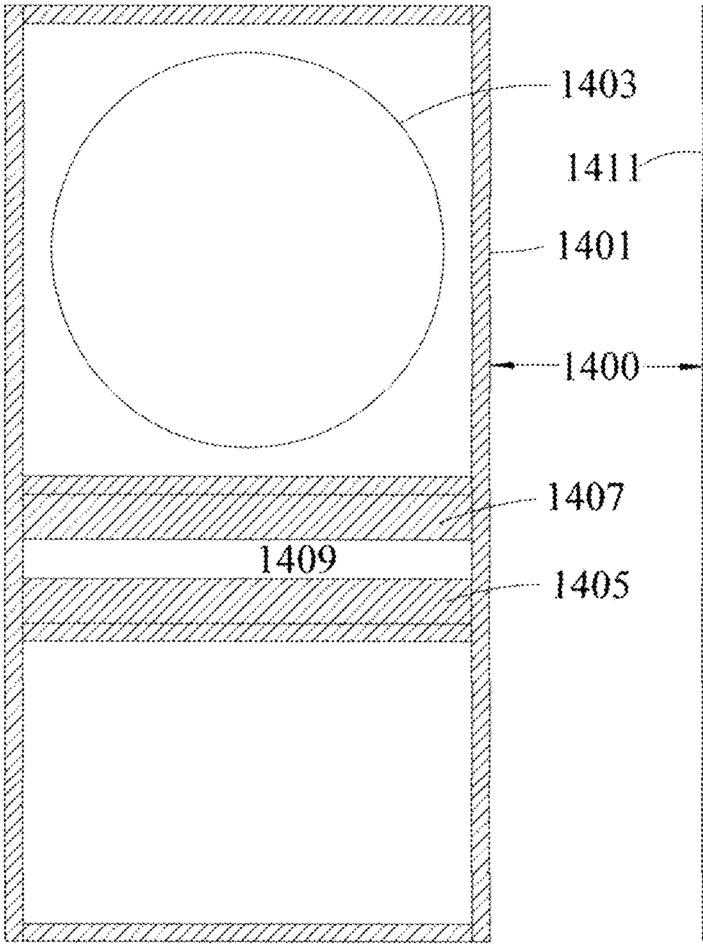
FIGS. 14 and 15 illustrate a front and a side cut view of a preferred single speaker enclosure.
Figure 15:
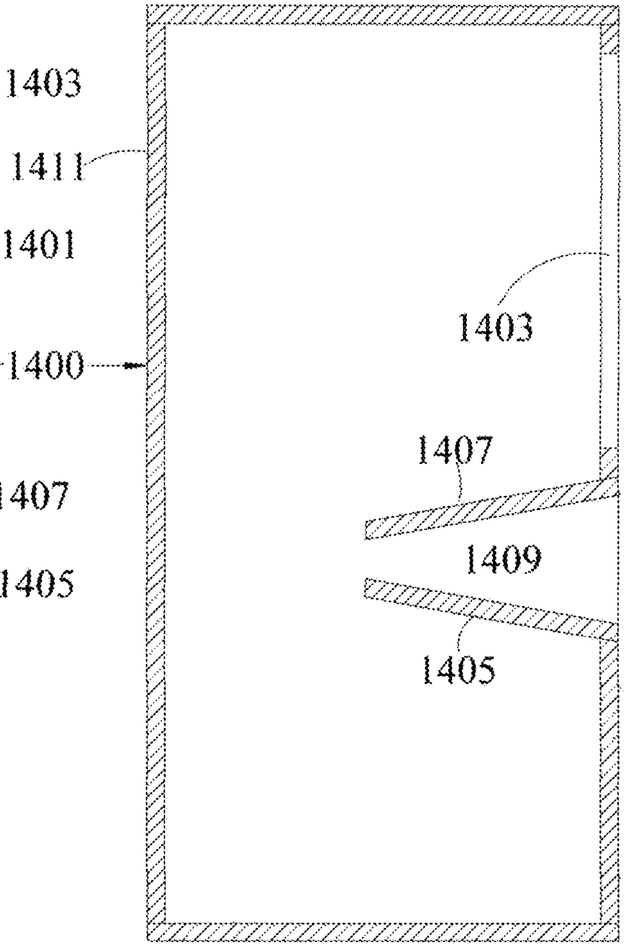

FIGS. 14 and 15 illustrate a front and a side cut view of a preferred single speaker enclosure 1400. It includes a cabinet 1401, with an opening 1403 (orifice) to receive and mount a speaker assembly using a present invention cone unit (not shown). It includes a vent 1409 for air movement, with vent baffles 1405 and 1407. Details for cabinet calculations such as this are set forth in the general discussion above.

Figure 16:
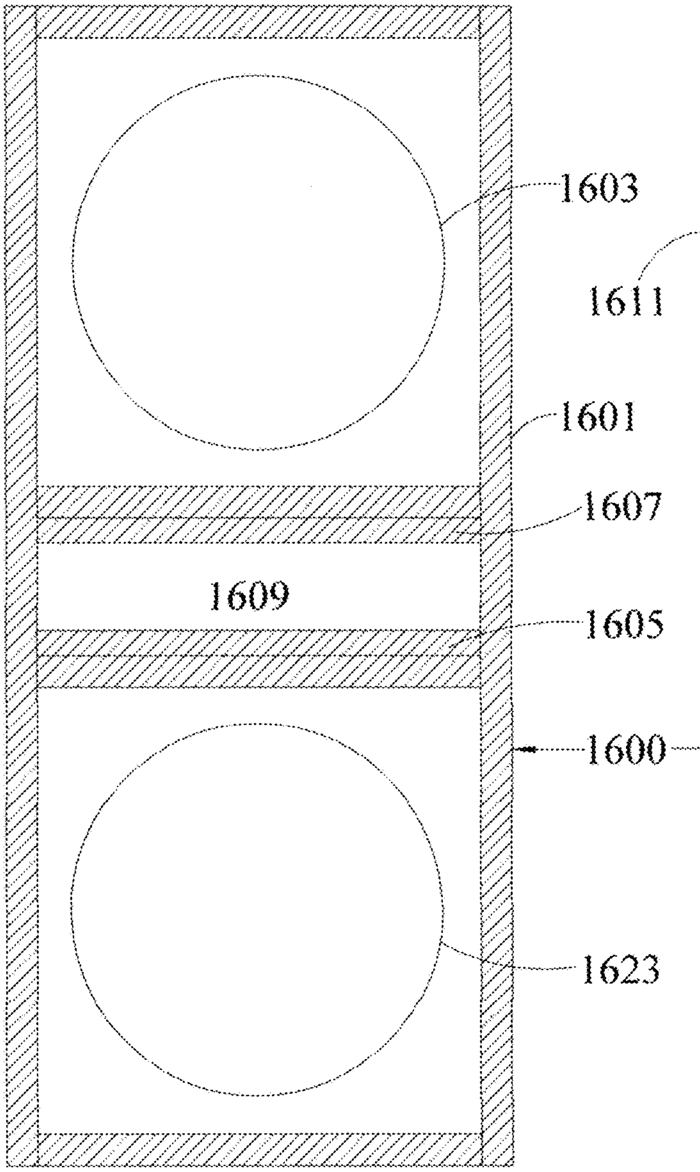
FIGS. 16 and 17 illustrate a front and a side cut view of a preferred double speaker enclosure; and, FIG. 18 shows speaker impedance curves for the present invention speaker cone unit
Figure 17:
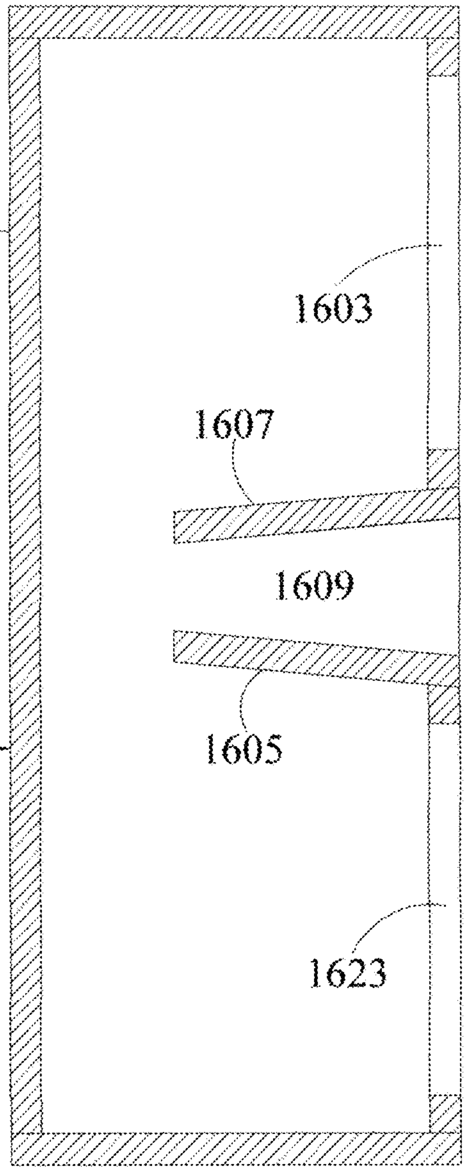

FIGS. 16 and 17 illustrate a front and a side cut view of a preferred double speaker enclosure 1600. It includes a cabinet 1601, with two opening 1603 and 1623 to receive and mount two speaker assemblies using two present invention cone units (not shown). It includes a vent 1609 for air movement, with vent baffles 1605 and 1607. The speaker assemblies may be the same or of different frequency ranges. Details for cabinet calculations such as this are set forth in the general discussion above.

Figure 18:
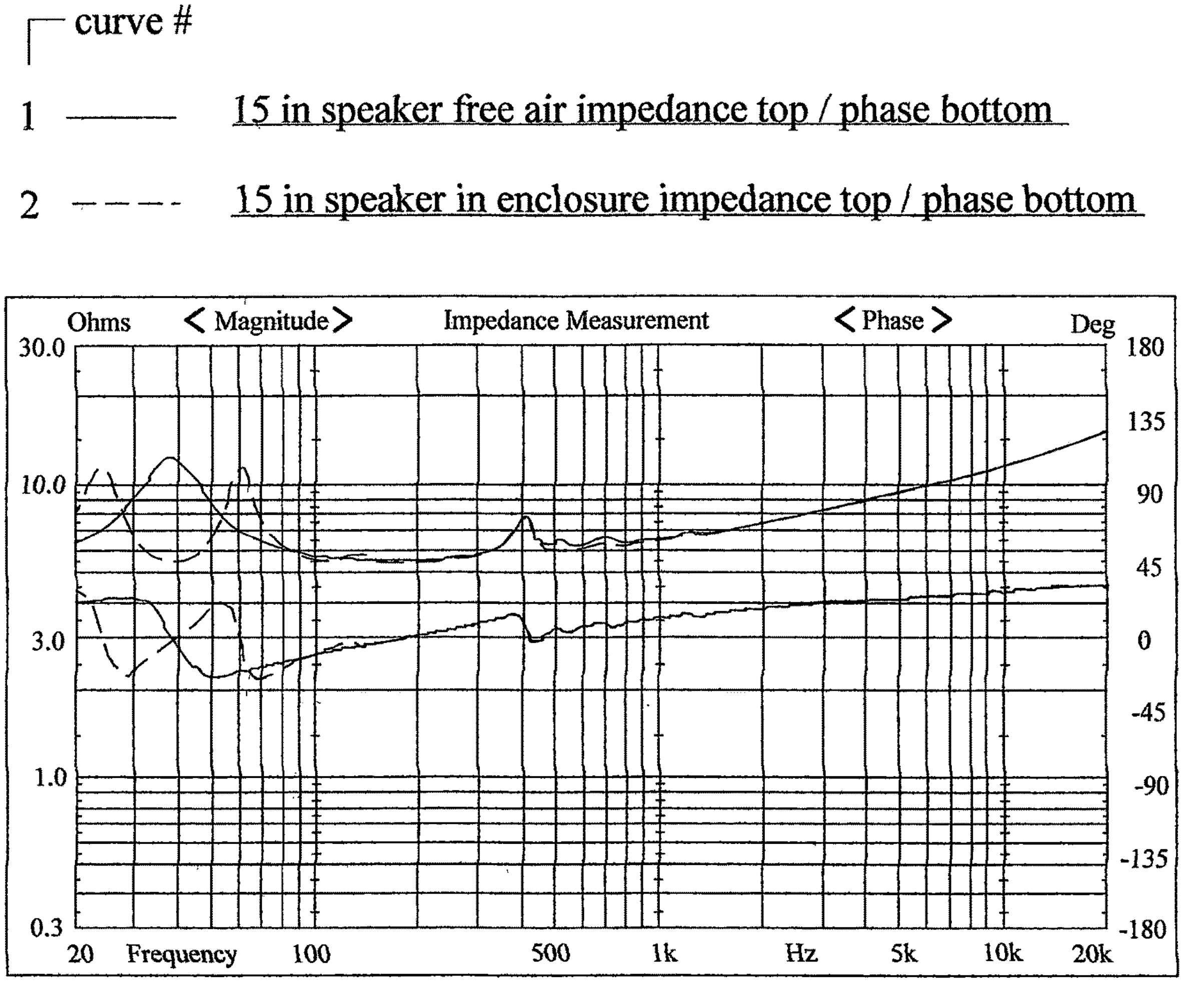
Figure 19:
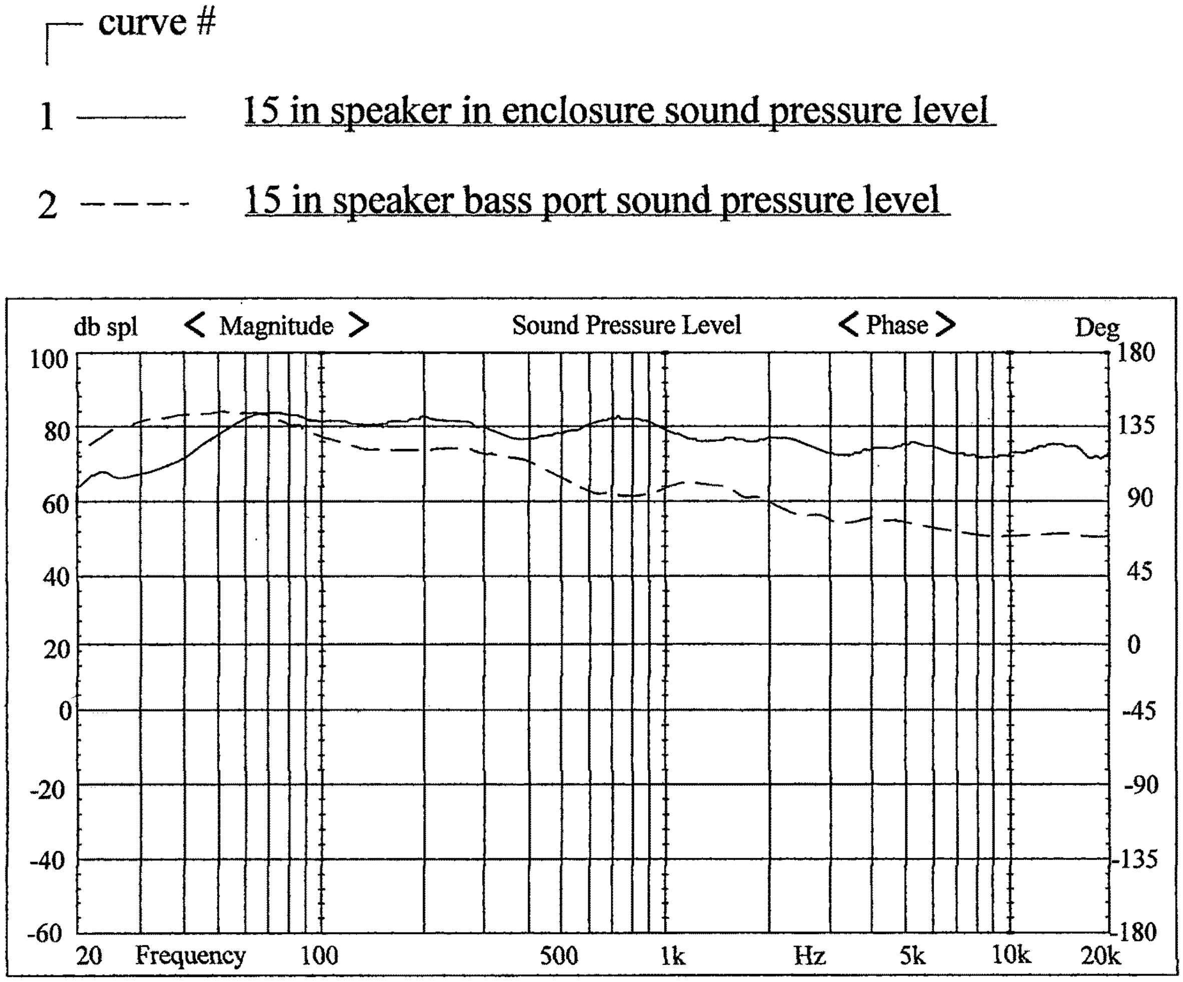
FIG. 19 shows speaker frequency response sound pressure curves for a present invention speaker cone unit.

FIG. 18 shows speaker impedance curves for a present invention unistructural speaker cone unit for a 15 inch non modified stock speaker driver. One curve is a free air measured speaker impedance curve super imposed over a in box speaker impedance curve. The larger peak shown at 39 Hz is the free air resonance measurement and the two smaller peaks on ether side is the in box measurement. The bottom curves are the phase response curves for each impedance curve super imposed over each other. Where the the two phase curves intersect at 39 Hz which is zero phase this indicates a perfect match to the speaker enclosure and port for this speaker. The small peak at 375 Hz is caused by the extended voice coil former needed for this driver basket which was deeper than needed for the present invention cone. FIG. 19 shows frequency response sound pressure level curves for the same 15 inch speaker driver using present invention speaker cone unit and speaker enclosure wave guide port. The sound pressure level response for the speaker is shown by the solid line, and port response by the dotted line. Both response curves were measured on axis near field to the speaker and port at the same distance and level settings. The drop in energy from 1 KHz to 20 KHz is due to the added mass of the extended voice coil former. The extended high frequency response is smooth out to beyond 20 KHz. As can be seen by the dotted port response curve, the low end has been extended down to 20 Hz. What else can be seen is the smooth off axis response for the speaker as measured from the port location. For response curves as seen in FIGS. 18 and 19 their results would be impossible to achieve with a conventional single or multiple speaker system.

Although particular embodiment's of the invention have been described in detail herein with reference to the accompanying drawings, it is to be understood that the invention is not limited to those particular embodiment's, and that various changes and modifications may be effected therein by one skilled in the art without departing from the scope or spirit of the invention as defined in the appended claims.

What is claimed is:

1. An acoustic speaker cone unit for conversion of electromechanical energy to a broad range of audio frequency sounds, which comprises:

said acoustic speaker cone unit being a single, unistructurally formed cone unit that includes:

a) a suspension ring having a flat outer rim edge and a flat inner rim edge, and having at least one continuous loop rib;

b) a central dome shaped cone, being a central diaphragm, having a plurality of thin, pie-shaped segments which radiate outwardly from the center of said central dome shaped cone, all of said segments having an arcuated cross-section, thereby creating a concave side and a convex side to each such segment, all of said concave sides facing one direction and all of said convex sides of said segments facing an opposite direction, and wherein all of said arcuated segments have a highly concave cross-section toward said central dome shaped cone center and a less concave cross-section with increasing radial distance away from said center, and wherein said central dome shaped cone is convex towards said center, and wherein said central dome shaped cone has a base wall extending downwardly from said pie-shaped segments and connected to a plurality of segments of a main diaphragm;

c) said main diaphragm having said plurality of segments radiating outwardly from said central dome shaped cone and extending to said inner edge of said suspension ring, each of said main diaphragm segments having an arcuate cross-section, thereby creating a concave side and a convex side to each such segment, all of said concave sides of said main diaphragm segments facing one direction and all of said convex sides of said segments facing an opposite direction, and further wherein said main diaphragm segments have a highly concave cross-section towards center and a less concave cross-section with increasing radial distance away from its center, and wherein each main diaphragm segment has a plurality of arcuate ribs, positioned concentrically relative to one another.

2. The acoustic speaker cone unit of claim 1 wherein there are an even number of main diaphragm segments.

3. The acoustic speaker cone unit of claim 2 wherein there are ten to thirty main diaphragm segments.

4. The acoustic speaker cone unit of claim 3 wherein there are fourteen to twenty-two main diaphragm segments.

5. The acoustic speaker cone unit of claim 4 wherein there are eighteen main diaphragm segments.

6. The acoustic speaker cone unit of claim 1 wherein each of said plurality of main diaphragm segments has at least two arc ribs, and further, wherein the number of arc ribs on each increase with increasing size of said acoustic speaker.

7. The acoustic speaker cone unit of claim 6 wherein each of said plurality of main diaphragm segments have four to ten arc ribs.

8. The acoustic speaker cone unit of claim 7 wherein each of said plurality of main diaphragm segments have four to six arc ribs.

9. The acoustic speaker cone unit of claim 6 wherein said main diaphragm segment arc ribs have semi-circular cross-sections.

10. The acoustic speaker cone unit of claim 6 wherein said main diaphragm segment arc ribs have a sequentially increasing size as determined radially from center outwardly.

11. The acoustic speaker cone unit of claim 9 wherein said main diaphragm segment arc ribs have a sequentially increasing size as determined radially from center outwardly wherein said size is increasing linearly with increasing radial distance.

12. The acoustic speaker cone unit of claim 6 wherein said main diaphragm segments each have at least one radial rib that intersect at least one of said main diagram segment arc ribs.

13. The acoustic speaker cone unit of claim 1 wherein said main diaphragm segments have a lessening concave cross-section with increasing radial distance from the center of the cone whereby the width of the segment increases linearly with increasing radial distance so as to create constant acoustical resistance radially.

14. The acoustic speaker cone unit of claim 13 wherein there are eighteen main diaphragm segments.

15. The acoustic speaker cone unit of claim 1 wherein said at least one continuous loop rib of said suspension ring is a single continuous loop rib.

16. The acoustic speaker cone unit of claim 15 wherein said single continuous loop rib is located on said ring inner edge of said suspension ring.

17. The acoustic speaker cone unit of claim 16 wherein said outer edge of said suspension ring has a shape selected from the group consisting of round, oval, rectangular and polygon.

18. The acoustic speaker cone unit of claim 1 wherein said outer edge of said suspension ring has a round shape.

19. The acoustic speaker cone unit of claim 1 wherein said acoustic speaker cone unit is a unistructural plastic acoustic speaker cone unit.

20. The acoustic speaker cone unit of claim 19 wherein said plastic is polyvinyl chloride.

* * * * *